(12) United States Patent
Makisumi et al.

(10) Patent No.: US 11,781,637 B2
(45) Date of Patent: Oct. 10, 2023

(54) TRANSMISSION WITH FALLING-OFF PREVENTION FEATURE

(71) Applicant: Nabtesco Corporation, Tokyo (JP)

(72) Inventors: Kazuyoshi Makisumi, Tokyo (JP); Yoshiaki Makizoe, Tokyo (JP)

(73) Assignee: NABTESCO CORPORATION, Tokyo (JP)

( * ) Notice: Subject to any disclaimer, the term of this patent is extended or adjusted under 35 U.S.C. 154(b) by 0 days.

(21) Appl. No.: 17/743,038

(22) Filed: May 12, 2022

(65) Prior Publication Data

US 2022/0373074 A1 Nov. 24, 2022

(30) Foreign Application Priority Data

May 20, 2021 (JP) .................................. 2021-085008
Oct. 6, 2021 (JP) .................................. 2021-164594

(51) Int. Cl.
*F16H 57/023* (2012.01)
*F16H 1/32* (2006.01)

(52) U.S. Cl.
CPC ............. *F16H 57/023* (2013.01); *F16H 1/32* (2013.01); *F16H 2001/323* (2013.01); *F16H 2057/0235* (2013.01)

(58) Field of Classification Search
CPC .... F16H 1/32; F16H 2001/323; F16H 57/025; F16H 2057/02069; F16H 2057/02073
See application file for complete search history.

(56) References Cited

U.S. PATENT DOCUMENTS

| | | | |
|---|---|---|---|
| 5,078,027 A * | 1/1992 | Lohmer | B60K 5/12 74/606 R |
| 5,501,122 A * | 3/1996 | Leicht | F16H 57/025 74/606 R |
| 8,464,413 B1 | 6/2013 | Prater et al. | |
| 9,815,192 B1 | 11/2017 | Du et al. | |
| 2005/0221941 A1 | 10/2005 | Nihei et al. | |
| 2014/0298939 A1 | 10/2014 | Kim et al. | |
| 2018/0079074 A1 | 3/2018 | Devengenzo et al. | |
| 2019/0203825 A1 | 7/2019 | Yamauchi et al. | |

FOREIGN PATENT DOCUMENTS

| | | | | |
|---|---|---|---|---|
| JP | 2004-138094 A | | 5/2004 | |
| JP | 2012117609 A | * | 6/2012 | .......... B25J 19/0029 |
| JP | 2016-205601 A | | 12/2016 | |
| JP | 2020-193624 A | | 12/2020 | |
| KR | 20130045044 A | * | 5/2013 | |
| WO | WO-2014073185 A1 | * | 5/2014 | ............... F16D 1/06 |

OTHER PUBLICATIONS

Extended European Search Report dated Oct. 24, 2022, issued in corresponding EP Application No. 22172978.3 (10 pgs.).

* cited by examiner

*Primary Examiner* — Sherry L Estremsky
(74) *Attorney, Agent, or Firm* — Pillsbury Winthrop Shaw Pittman, LLP

(57) ABSTRACT

A speed reducer with a falling-off prevention feature according to an aspect of the disclosure includes: a speed reducer for decelerating rotation from a drive source that generates a rotational force and outputting the decelerated rotation, the speed reducer being mounted to a robot; and a coupling member for coupling the speed reducer to the robot. The coupling member maintains coupling between the speed reducer and the robot irrespective of displacement of the speed reducer relative to the robot.

9 Claims, 8 Drawing Sheets

TRANSMISSION WITH FALLING-OFF PREVENTION FEATURE

CROSS-REFERENCE TO RELATED APPLICATIONS

This application is based on and claims the benefit of priority from Japanese Patent Application Serial Nos. 2021-085008 (filed on May 20, 2021) and 2021-164594 (filed on Oct. 6, 2021), the contents of which are incorporated herein.

TECHNICAL FIELD

The present disclosure relates to a transmission with a falling-off prevention feature.

BACKGROUND

There have been known falling-off prevention devices for retaining a transmission (speed reducer) provided on industrial robots such that it does not fall off from the robots. For example, in the falling-off prevention device disclosed in Japanese Patent Application Publication No. 2004-138094 ("the '094 Publication"), a projection is provided on a hold flange of the casing of the transmission, and a recess is provided in a plate on the robot side, thereby inhibiting the transmission from falling off.

However, with the configuration disclosed in the '094 Publication, the transmission may fall off from the robot in the case where the recess in the plate on the robot (mating member) side or the casing of the transmission is damaged. More secure measure is necessary in robots placed close to humans or those working in cooperation with humans.

SUMMARY

One object of the present disclosure is to provide a transmission with a falling-off prevention feature capable of inhibiting the transmission from falling off from a mating member.

A transmission with a falling-off prevention feature according to an aspect of the present disclosure comprises: at least one transmission for changing a speed of rotation of a drive source that generates a rotational force and outputting the rotation at the changed speed; and a coupling member for coupling the transmission to a mating member to which the transmission is mounted. The coupling member maintains coupling between the transmission and the mating member irrespective of displacement of the transmission relative to the mating member.

With the above configuration, even when a malfunction occurs in the speed reducer and the speed reducer is displaced relative to the mating member, the coupling member can maintain the coupling between the mating member and the speed reducer. Therefore, the transmission can be inhibited from falling off from the mating member. Also, there is no need of special design for preventing falling-off of the transmission, for example, providing a projection on a hold flange of the transmission as in the conventional art described above. In other words, the transmission can be coupled to the mating member using the coupling member without additional processing on the transmission. This allows for a greater degree of freedom in the design of the transmission and increases the versatility of the transmission with the falling-off prevention feature.

In the above configuration, the coupling member is shaped like a string.

In the above configuration, the transmission may include a casing fixed to the mating member. The coupling member may couple the casing to the mating member.

In the above configuration, the casing may include a flange portion having a through-hole extending through the flange portion in an axial direction of the transmission. A fixing member inserted or screwed into the through-hole may be provided. The coupling member may be mounted to the fixing member.

In the above configuration, the coupling member may include a first coupling member fixed to the casing with the fixing member.

In the above configuration, the coupling member may include a second coupling member fixed to an outer peripheral surface of the casing with the fixing member.

In the above configuration, the coupling member may include a third coupling member wound on and fixed to the through-hole.

In the above configuration, the flange portion may have a groove for receiving the third coupling member embedded therein. The groove may be continuous to the through-hole.

In the above configuration, the transmission may receive the rotation of the drive source. The transmission may include a hollow shaft extending in an axial direction of the transmission. The coupling member may include a fourth coupling member extending through the hollow shaft.

In the above configuration, the at least one transmission may comprise a plurality of transmissions provided on the mating member. Each of the plurality of transmissions may be connected to the mating member with the coupling member.

In the above configuration, the transmission may include: a casing fixed to the mating member; at least one crankshaft provided in the casing and configured to rotate by receiving the rotation of the drive source; and an output shaft provided in the casing and configured to output decelerated rotation of the drive source. The transmission may serve as an eccentric oscillating speed reducer in which rotation of the at least one crankshaft is decelerated and transmitted to the output shaft such that the output shaft rotates at a lower speed relative to the rotation of the drive source.

A transmission with a falling-off prevention feature according to another aspect of the present disclosure comprises: a transmission for changing a speed of rotation of a drive source that generates a rotational force and outputting the rotation at the changed speed; and a coupling member for coupling the transmission to a mating member including the transmission. The transmission includes: a casing fixed to the mating member; at least one crankshaft provided in the casing and configured to rotate by receiving the rotation of the drive source; and an output shaft provided in the casing and configured to output decelerated rotation of the drive source. The transmission serves as an eccentric oscillating speed reducer in which rotation of the at least one crankshaft is decelerated and transmitted to the output shaft such that the output shaft rotates at a lower speed relative to the rotation of the drive source.

With the above configuration, the transmission can be inhibited from falling off from the mating member. Also, there is no need of special design for preventing falling-off of the transmission, for example, providing a projection on a hold flange of the transmission as in the conventional art described above. In other words, the transmission can be coupled to the mating member using the coupling member without additional processing on the transmission. This allows for a greater degree of freedom in the design of the transmission and increases the versatility of the transmission with the falling-off prevention feature.

The present disclosure provides a transmission with a falling-off prevention feature capable of inhibiting the transmission from falling off from a mating member.

DESCRIPTION OF THE EMBODIMENTS

Figure 1:
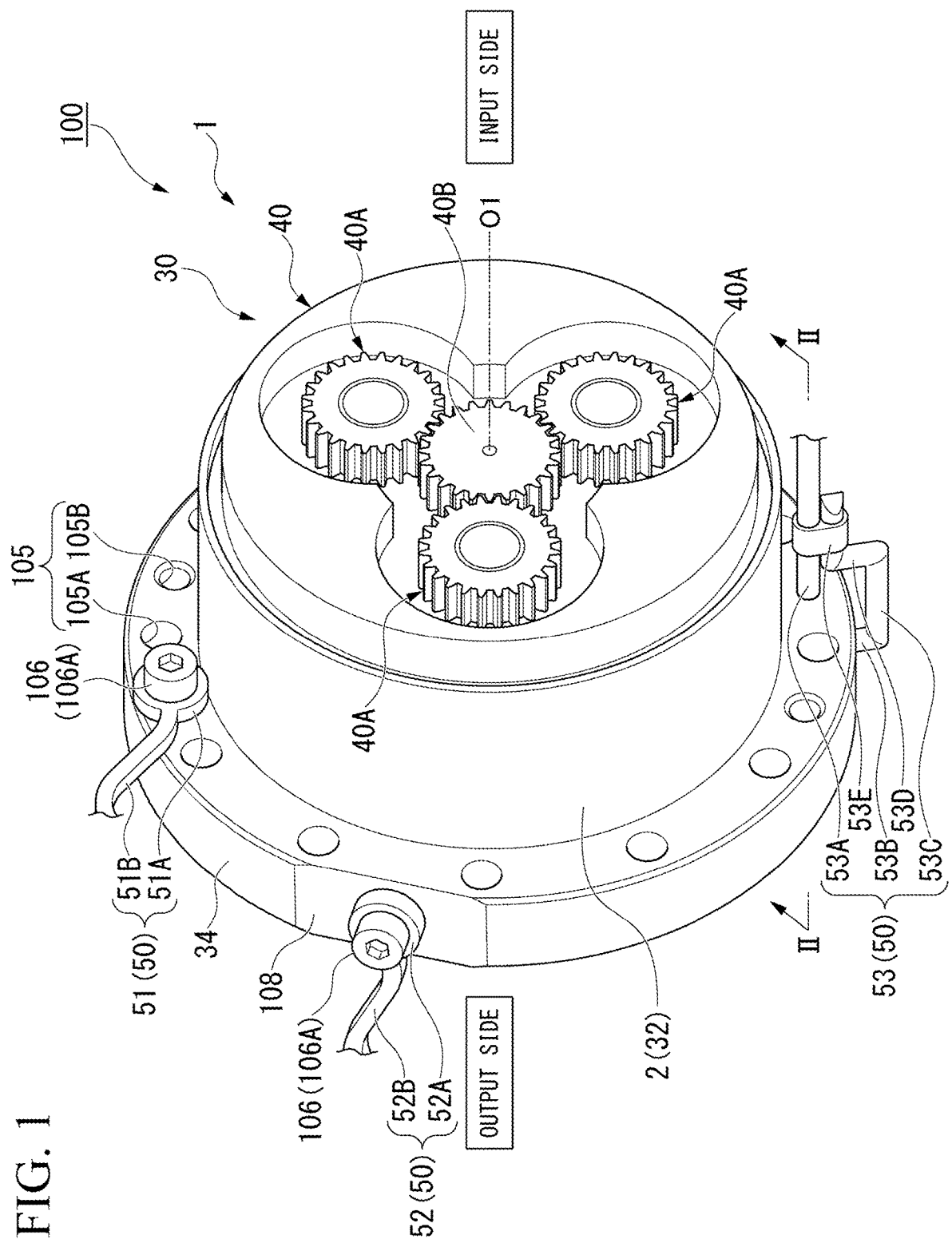
FIG. 1 is a perspective view showing an example of a transmission with a falling-off prevention feature according to a first embodiment.

The following now describes in detail a transmission with a falling-off prevention feature according to embodiments of the present disclosure with reference to the drawings. In the following description of the embodiments, the corresponding elements will be denoted by the same reference numerals and may not be repeatedly described. In the following description, such terms as "parallel," "orthogonal," "center" and "coaxial" may appear to describe relative or absolute positions. These terms are not only strictly used but also allow some tolerances and relative differences in angle and distance as long as the same effects can be still produced.

First Embodiment

Figure 2:
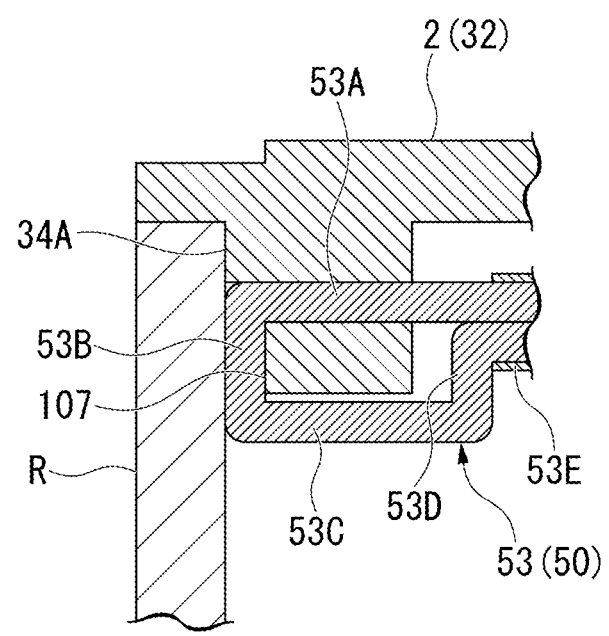
FIG. 2 is a sectional view along the line II-II in FIG. 1.

FIG. 1 is a perspective view of a speed reducer 100 with a falling-off prevention feature according to a first embodiment. FIG. 2 is a sectional view along the line II-II in FIG. 1. FIG. 1 does not show a robot R, while FIG. 2 shows it. As shown in FIGS. 1 and 2, the speed reducer 100 with a falling-off prevention feature according to this embodiment includes: a speed reducer 1 for decelerating rotation from a drive source that generates a rotational force and outputting the decelerated rotation; and a coupling member 50 for coupling the speed reducer 1 to the robot R (FIG. 2) using the speed reducer 1.

Robot (Mating Member)

The robot R is preferably an industrial robot, and it is more preferably a cooperation robot. In the field of factory automation (FA) and the like, a cooperation robot refers to "a robot cooperating with workers." The robot R may also be an articulated robot having a plurality of transmissions.

Speed Reducer

The speed reducer 1 is provided at a connection portion between a pair of arms that are rotatably connected (a joint portion of the robot R). The speed reducer 1 decelerates a motor torque inputted thereto from a motor serving as a drive source (not shown) and outputs the decelerated torque. The configuration of the speed reducer 1 described below is not limitative. The speed reducer 1 may have any configuration that can change the speed of the rotation of the drive source that generates a rotational force. For example, the speed reducer 1 may be replaced with a speed-increasing gear for accelerating the rotation of the drive source that generates a rotational force and outputting the accelerated rotation.

The speed reducer 1 is what is called a solid transmission having a solid input shaft 8 (described later). The speed reducer 1 includes a casing 30 and a speed reduction mechanism 40. The casing 30 includes a body portion 32 and a flange portion 34. The flange portion 34 is shaped such that it extends outward in the radial direction from the body portion 32. In the description of the first embodiment, the term "axial direction" refers to the direction extending along the axis O1 of the body portion 32. The term "radial direction" refers to the direction intersecting the axis O1 when viewed in the axial direction. The term "circumferential direction" refers to the direction extending around the axis O1. The term "input side" refers to the side of the speed reducer 1 connected to the drive source. The term "output side" refers to the side of the speed reducer 1 connected to a mechanical part such as an arm receiving the output from the speed reducer 1. The drive source is an example of a first member. The mechanical part such as the arm is an example of a second member. The speed reducer 1 is configured to change the number of rotations at a predetermined ratio and transmit a resulting driving force between the first member and the second member.

The body portion 32 is shaped like a cylinder extending along the axis O1. The body portion 32, which is an example of a first cylinder, is open at the input side in the direction of the axis O1. The opening of the body portion 32 houses the speed reduction mechanism 40 so as to be rotatable. The flange portion 34 is integrated with the output side of the body portion 32. The speed reducer 1 has a plurality of (for example, three) transmission gears 40A and an input gear 40B, and these gears are exposed on the input side of the speed reducer 1.

The flange portion 34 is provided on the outer periphery of the casing 30. The flange portion 34 has through-holes 105 extending through the flange portion 34 in the axial direction. The through-holes 105 include first through-holes 105A and second through-holes 105B. The first through-holes 105A are arranged at certain intervals in the circumferential direction, and the second through-holes 105B are provided between adjacent ones of the first through-holes 105A in the circumferential direction. The first through-holes 105A are fastening holes penetrated by fastening members (not shown) such as bolts for fastening the speed reducer 1 and the robot R together. The second through-holes 105B has female threads (not shown) formed therein. The second through-holes 105B threadably receives fixing members 106 (described later).

The flange portion 34 has a groove 107 formed in a surface 34A that contacts with the robot R. The groove 107 is continuous to the second through-hole 105B. The groove 107 extends from the output side end of the second through-hole 105B radially outward along the radial direction.

The flange portion 34 has an outer peripheral surface 108 formed in the outer peripheral surface of the flange portion 34. In the middle of the outer peripheral surface 108 in the circumferential direction, a female screw (not shown) is formed. The female screw threadably receives the fixing member 106 (described later).

Fixing Members

The fixing members 106 are screwed into the female screw of the outer peripheral surface 108 and the second through-holes 105B of the flange portion 34. Each of the fixing members 106 includes a head 106A projecting toward the input side and a shaft 106B (FIG. 6) having a smaller diameter than the head 106A. The shafts 106B of the fixing members 106 are screwed into the second through-holes 105B of the flange portion 34. The fixing members 106 screwed into the second through-holes 105B are used to fix the coupling member 50 (this configuration will be described in detail later).

Figure 3:
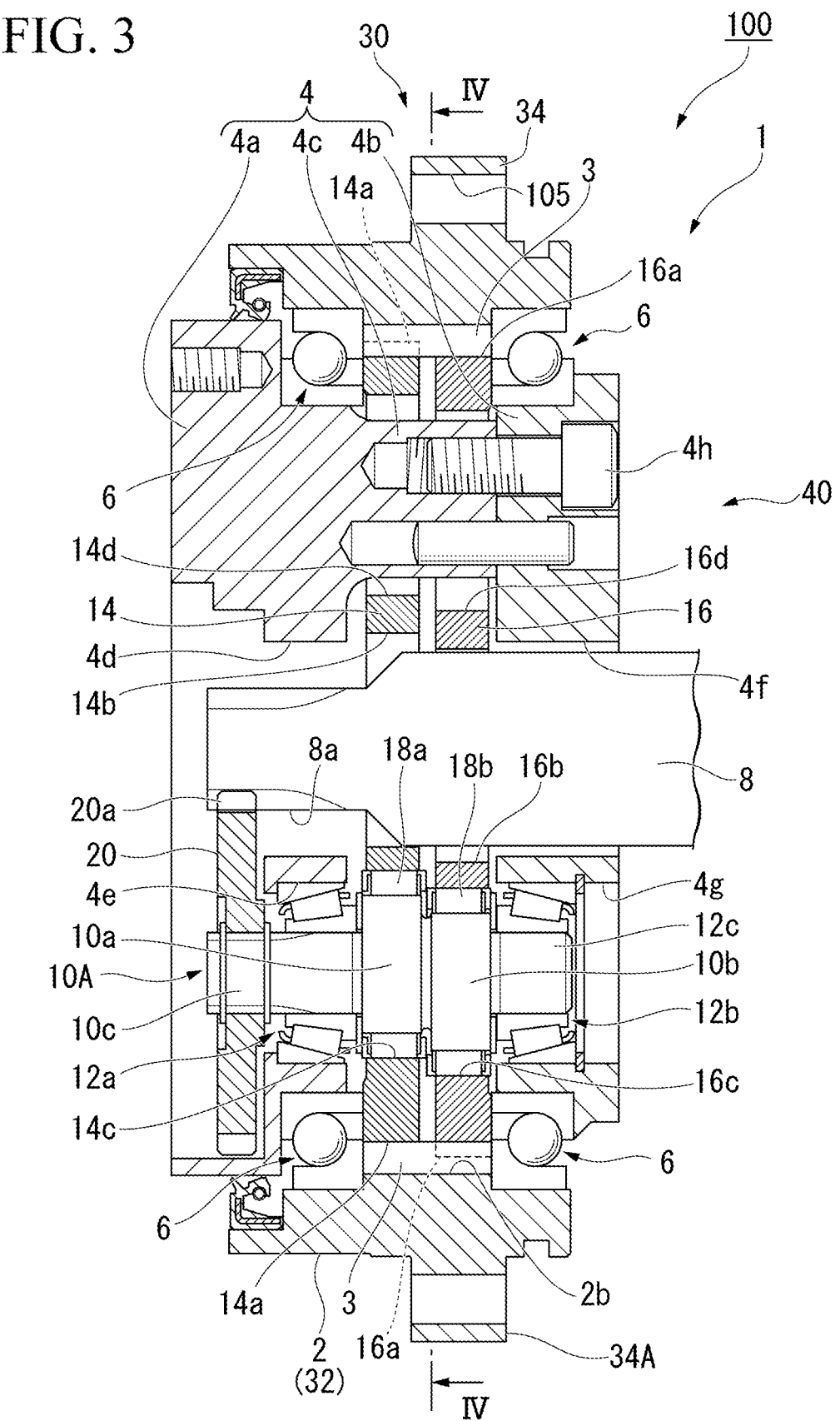
FIG. 3 is a sectional view of the transmission with the falling-off prevention feature according to the first embodiment.
Figure 4:
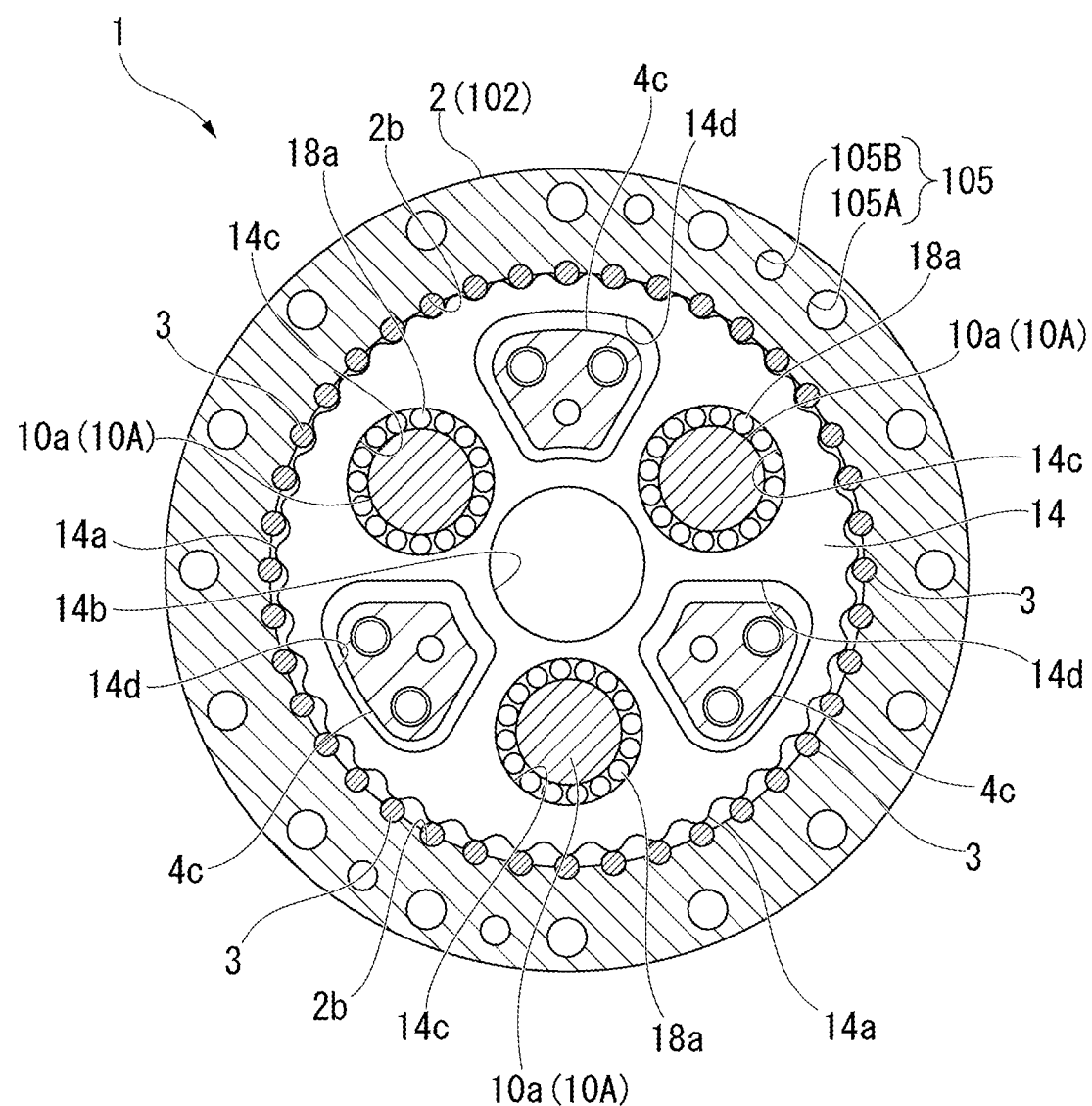
FIG. 4 is a sectional view along the line IV-IV in FIG. 3.

FIG. 3 is a sectional view of the speed reducer 100 with the falling-off prevention feature according to the embodiment, and FIG. 4 is a sectional view along the line IV-IV in FIG. 3. In the speed reducer 1, the input gear 40B corresponds to an input shaft 8. As the input shaft 8 is rotated, a crankshaft 10A is resultantly rotated. In conjunction with eccentric portions 10a and 10b of the crankshaft 10A, the oscillating gears 14 and 16 are oscillatorily rotated. In this way, the input rotation is decelerated, and the decelerated rotation can be output.

As shown in FIGS. 3 and 4, the speed reducer 1 includes an external cylinder 2 corresponding to the body portion 32 (the first cylinder), a carrier 4 (output shaft), which is an example of the second cylinder, the input shaft 8, a plurality of (for example, three) crankshafts 10A, the first oscillating gear 14, the second oscillating gear 16, and the plurality of (for example, three) transmission gears 20. The transmission gears 20 correspond to the transmission gears 40A in FIG. 1.

The external cylinder 2 constitutes the outer surface of the speed reducer 1. The external cylinder 2 has a cylindrical shape. The external cylinder 2 has a plurality of pin grooves 2b formed in the inner circumferential surface thereof. The pin grooves 2b extend in the axial direction of the external cylinder 2. The pin grooves 2b have a semicircular sectional shape when cut along a plane orthogonal to the axial direction. The pin grooves 2b are arranged at regular intervals in the circumferential direction along the inner circumferential surface of the external cylinder 2.

The external cylinder 2 has a plurality of internal tooth pins 3. The internal tooth pins 3 are attached in the pin grooves 2b. More specifically, each internal tooth pin 3 is fitted in the corresponding pin groove 2b and retained therein such that it extends in the axial direction of the external cylinder 2. In this manner, the plurality of internal tooth pins 3 are arranged at regular intervals along the circumference of the external cylinder 2. The internal tooth pins 3 mesh with first external teeth 14a of the first oscillating gear 14 and second external teeth 16a of the second oscillating gear 16.

The carrier 4 is housed within the external cylinder 2 while being coaxial with the external cylinder 2. The carrier 4 is rotatable relative to the external cylinder 2 (casing 30) about the same axis. More specifically, the carrier 4 is disposed on the radially inner side of the external cylinder 2. In this state, the carrier 4 is supported by a pair of main bearings 6, which are spaced away from each other in the axial direction, so as to be rotatable relative to the external cylinder 2.

The carrier 4 includes a base portion and an end plate 4b. The base portion includes a base plate 4a and a plurality of (for example, three) shaft portions 4c.

The input shaft 8 serves as an input part for receiving a driving force input thereto from a driving motor (not shown). The input shaft 8 is inserted into the through-hole 4f in the end plate 4b and the through-hole 4d in the base plate 4a. The input shaft 8 is disposed such that the central axis thereof is aligned with the central axis of the external cylinder 2 and the carrier 4. The input shaft 8 is rotatable about the axis. An input gear 8a is provided on the outer circumferential surface of the distal end of the input shaft 8.

In the external cylinder 2, the three crankshafts 10A are arranged at regular intervals around the input shaft 8 (see FIG. 4). The crankshafts 10A are each supported by a pair of crank bearings 12a and 12b so as to be rotatable about an axis relative to the carrier 4 (see FIG. 3).

Each crankshaft 10A has a shaft body 12c and eccentric portions 10a and 10b integrated with the shaft body 12c.

One of the ends of each crankshaft 10A, or more specifically, the axially outer part than the portion mounted in the mounting hole 4e in the base plate 4a has a mating portion 10c to which the transmission gear 20 is mounted. The speed reducer 1 of the embodiment is not limited to the example shown in FIG. 3. The speed reducer 1 may be configured such that the crankshafts 10A are oriented oppositely in the axial direction, and the mating portions 10c are positioned on the axially outer side of the mounting holes 4g in the end plate 4b.

The first oscillating gear 14 is located in the closed space within the external cylinder 2 and is attached to the first eccentric portion 10a of each crankshaft 10A via a first roller bearing 18a. As each crankshaft 10A rotates, the first eccentric portion 10a eccentrically rotates. The eccentric rotation results in the first oscillating gear 14 oscillatorily rotating while meshing with the internal tooth pins 3.

The second oscillating gear 16 is located in the closed space within the external cylinder 2 and is attached to the second eccentric portion 10b of each crankshaft 10A via a second roller bearing 18b. The first and second oscillating gears 14 and 16 are next to each other in the axial direction correspondingly to the first and second eccentric portions 10a and 10b. As each crankshaft 10A rotates, the second eccentric portion 10b eccentrically rotates. The eccentric rotation results in the second oscillating gear 16 oscillatorily rotating while meshing with the internal tooth pins 3.

Each transmission gear 20 transmits the rotation of the input gear 8a to the corresponding one of the crankshafts 10A. Each transmission gear 20 is fitted on the mating portion 10c at one end of the shaft body 12c of the corresponding crankshaft 10A. Each transmission gear 20 is rotatable integrally with the crankshaft 10A around the same axis as the crankshaft 10A. Each transmission gear 20 has external teeth 20a meshing with the input gear 8a.

Coupling Member

As shown in FIGS. 1 and 2, the coupling member 50 for coupling the speed reducer 1 to the robot R couples the casing 30 of the speed reducer 1 to the robot R. The coupling member 50 is a string-shaped member. The coupling member 50 is preferably formed of steel wire or stainless wire for rust-proofing.

However, the coupling member 50 is not limited to these materials, but it may be a member formed of any material shaped like a string. A string-shaped member satisfies, for example, any one or any combination of the following features.

(1) It is long in one direction.
(2) It can be bent and deformed.
(3) It can be elastically deformed so as to be bent.
(4) It can be deformed by expanding and contracting (deformed by bending) in one direction.

The coupling member 50 may be formed of, for example, steel wire, stainless wire, resin, electrically conductive wire, nylon, polyester, polypropylene, polyethylene, vinylon (Cremona), cotton, or hemp, and it may alternatively be formed of a chain, a rubber string, or a coil spring. For a rubber string, the coupling member 50 preferably has a stretch rate of 300% or less relative to its free length. For a coil spring, the coupling member 50 preferably has a stretch rate of 150% or less relative to its free length. This is because when for example the speed reducer 1 is suspended by the coupling member 50, the coupling member 50 (a rubber string or a coil spring) is bent and deformed almost without stretching from its free length.

If the speed reducer 1 is lightweight, the coupling member 50 may be formed of a nonmetal material. For example, the coupling member 50 may be formed of resin. The coupling member 50 has such a length that it can couple the casing 30 to the robot R. The thickness of the coupling member 50 may be set in accordance with the weight of the speed reducer 1.

The coupling member 50 includes: a first coupling member 51 fixed to a fixing member 106; a second coupling member 52 fixed to a fixing member 106; and a third coupling member 53 wound on and fixed to a second through-hole 105B. The coupling member 50 may be formed by any one or any combined two or more of the first coupling member 51, the second coupling member 52, and the third coupling member 53. The coupling member 50 may also be formed by a plurality of any of the first coupling member 51, the second coupling member 52, and the third coupling member 53.

The first coupling member 51 includes: a first annular portion 51A having an annular shape and provided at an end of the first coupling member 51; and a first coupling base 51B having an end fastened and fixed to the first annular portion 51A. The first annular portion 51A is fixed to the flange portion 34 by the fixing member 106. Specifically, the ring of the first annular portion 51A is placed over the second through-hole 105B, and the shaft 106B of the fixing member 106 is screwed into the second through-hole 105B from the side opposite to the flange portion 34, thereby fixing the first coupling member 51 to the fixing member 106. The first coupling member 51 may be fixed using the first through-hole 105A together with the fixing member 106 fixing the robot R and the speed reducer 1.

The second coupling member 52 includes: a second annular portion 52A having an annular shape and provided at an end of the second coupling member 52; and a second coupling base 52B having an end fastened and fixed to the second annular portion 52A. The second annular portion 52A is fixed to the outer peripheral surface 108 by the fixing member 106. Specifically, the ring of the second annular portion 52A is placed over a fastening hole (not shown) provided in the outer peripheral surface 108, and the second shaft portion of the fixing member 106 is screwed into the fastening hole from the side opposite to the outer peripheral surface 108. Thus, the second coupling member 52 is fixed to the fixing member 106.

The third coupling member 53 is fixed using the second through-hole 105B into which no fixing member 106 is screwed. Specifically, the third coupling member 53 includes: a third coupling base 53A extending through the second through-hole 105B; a connection portion extending from the end of the third coupling base 53A in the radially outward direction of the flange portion 34; a first return portion 53C extending from the connection portion 53B in the direction along the third coupling base 53A; a second return portion 53D extending from the end of the first return portion 53C in the radially inward direction; and a joining tube 53E for caulking the end of the third coupling member 53 and the third coupling base 53A. The third coupling member 53 may be folded to form a ring.

The connection portion 53B is embedded in the groove 107. The first return portion 53C is positioned radially outside the outer peripheral surface of the flange portion 34. The end of the third coupling member 53 penetrates the second through-hole 105B and then penetrates the joining tube 53E together with the third coupling base 53A. After that, the joining tube 53E is caulked and elastically deformed. Thus, the end of the third coupling member 53 is caulked. In the embodiment, the end of the third coupling member 53 is caulked by the joining tube 53E. However, this configuration is not limitative. It is also possible that the third coupling member 53 is folded to form a ring and the end thereof is fixed by a knot or the like.

The other end of the coupling member 50 is fixed to the robot R. The configuration in which the other end of the coupling member 50 is fixed to the robot R is not particularly limited. The other end of the coupling member 50 may be configured in the same manner as in the above description of the one end of the coupling member 50 coupled to the speed reducer 1 (the casing 30).

Advantageous Effects

The following describes the advantageous effects of the first embodiment. The speed reducer 100 with the falling-off prevention feature described above includes: the speed reducer 1; and the coupling member 50 for coupling the speed reducer 1 to the robot R (FIG. 2) using the speed reducer 1. Therefore, even when a part of the speed reducer 1 is damaged, the speed reducer 1 can be inhibited from falling off from the robot R. More specifically, for example, even when a part of the speed reducer 1 is damaged and the speed reducer 1 is displaced relative to the robot R, the coupling member 50 can maintain the coupling between the robot R and the speed reducer 1. Therefore, the speed reducer 1 can be inhibited from falling off from the robot R.

There is no need of special design for preventing falling-off of the transmission, for example, providing a projection on a hold flange of the speed reducer 1 as in the conventional art described above. In other words, the speed reducer 1 can be coupled to the robot R using the coupling member 51 without additional processing on the speed reducer 1. This allows for a greater degree of freedom in the design of the speed reducer 1 and increases the versatility of the speed reducer 100 with the falling-off prevention feature.

In the speed reducer 100 with the falling-off prevention feature, the coupling member 50 is shaped like a string. This allows easy and flexible mounting of the coupling member 50 to the speed reducer 1 and the robot R.

The speed reducer 1 includes the casing 30 fixed to the robot R and the crankshaft 10A rotatably provided in the casing 30. The coupling member 50 couples the casing 30 to the robot R. Therefore, when the speed reducer 1 is mounted to the robot R, the coupling member 50 can be additionally mounted to the casing 30 of the speed reducer 1 and the robot R. This increases the work efficiency in mounting the speed reducer 1 to the robot R.

The speed reducer 100 with the falling-off prevention feature includes: the second through-holes 105B extending through the outer peripheral portion of the casing 30 in the axial direction; and the fixing members 106 inserted in the second through-holes 105B and fixed to the casing 30. The first coupling member 51 is mounted to the fixing member 106. Thus, the coupling member 50 is mounted to the fixing member 106 located on the outer peripheral portion of the casing 30, and therefore, the coupling member 50 can be mounted without interfering with the carrier 4 (output shaft) of the speed reducer 1.

In the above embodiment, the first coupling member 51 can be fixed using the fixing member 106. Therefore, the first coupling member 51 can be fixed easily. The fixing member 106 can be retrofitted to the speed reducer 1 having the through-holes 105. Therefore, the speed reducer 1 does not need to be designed specially. Security is further ensured since the second through-holes 105B are provided in addition to the first through-holes 105A, and the fixing members 106 are fixed to the second through-holes 105B.

The coupling member 50 includes the first coupling member 51 fixed to the fixing member 106. The first coupling member 51 is fixed by the fixing member 106. Therefore, the speed reducer 1 can be inhibited from falling off from the robot R. A worker can access the fixing member 106 from one side (any of the one end side and the other end side) of the casing 30. Therefore, the first coupling member 51 can be mounted easily.

The coupling member 50 includes the third coupling member 53 wound on and fixed to a through-hole. Therefore, the speed reducer 1 can be inhibited more securely from falling off from the robot R.

The outer peripheral portion of the casing 30 has the groove 107 that is continuous to the second through-hole 105B and receives the third coupling member 53 embedded therein. In other words, in the outer peripheral portion of the casing 30, the third coupling member 53 is embedded in the groove 107 that is continuous to the second through-hole 105B. Therefore, when the speed reducer 1 is mounted to the robot R, the third coupling member 53 does not interfere with the robot R, and neat appearance can be obtained. Since the third coupling member 53 is embedded in the groove 107, the third coupling member 53 can be inhibited from wearing. Therefore, the speed reducer 1 can be inhibited from falling off for a long period. When the casing 30 is fixed to the robot R, the robot R and the casing 30 do not press and break the third coupling member 53 interposed therebetween. Therefore, the third coupling member 53 can be prevented from being damaged.

The coupling member 50 includes the second coupling member fixed to the outer peripheral surface 108 of the casing 30. Therefore, the speed reducer 100 with the falling-off prevention feature can be externally checked in the lateral view.

Second Embodiment

Figure 5:
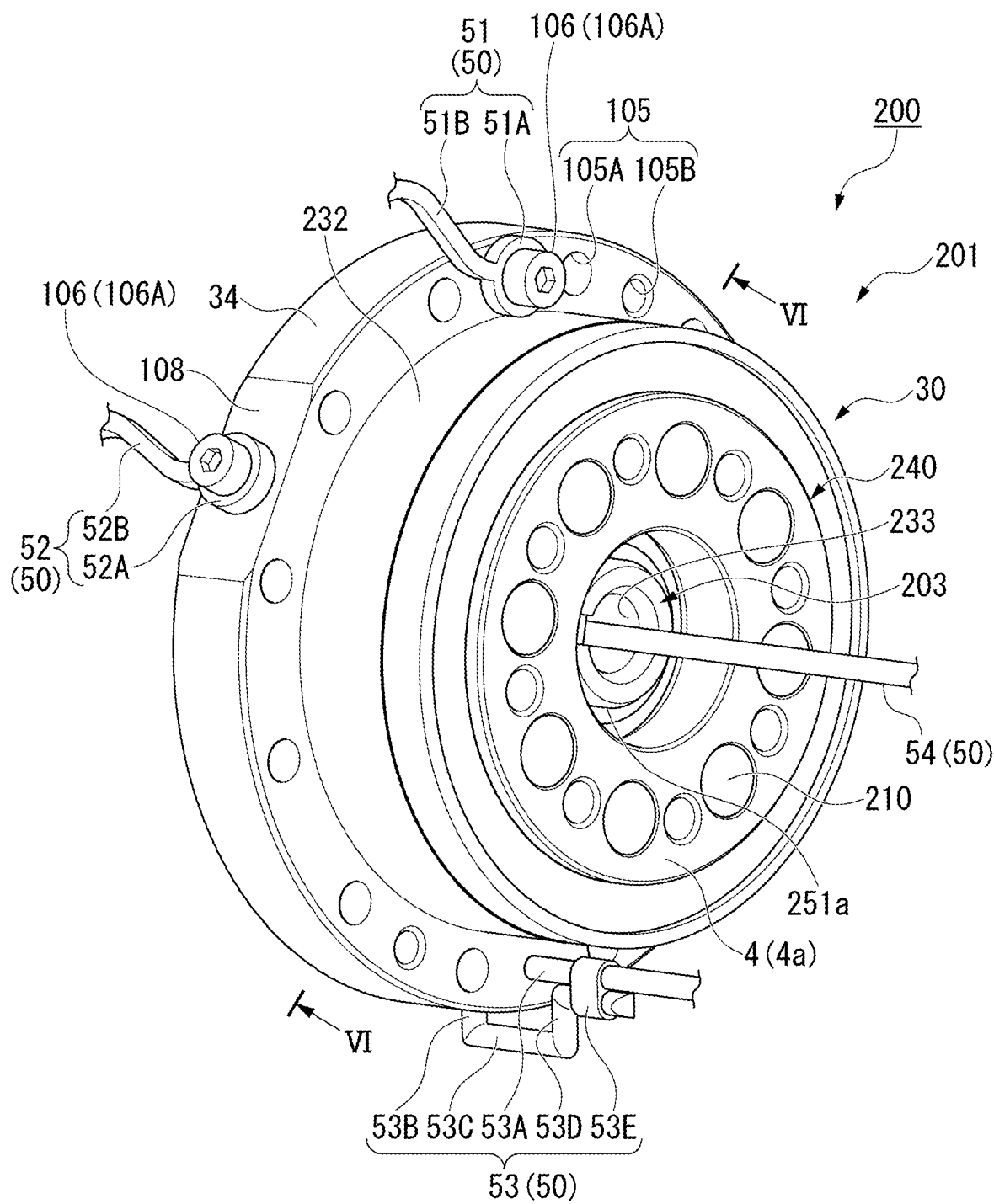
FIG. 5 is a perspective view showing an example of the transmission with the falling-off prevention feature according to the second embodiment.
Figure 6:
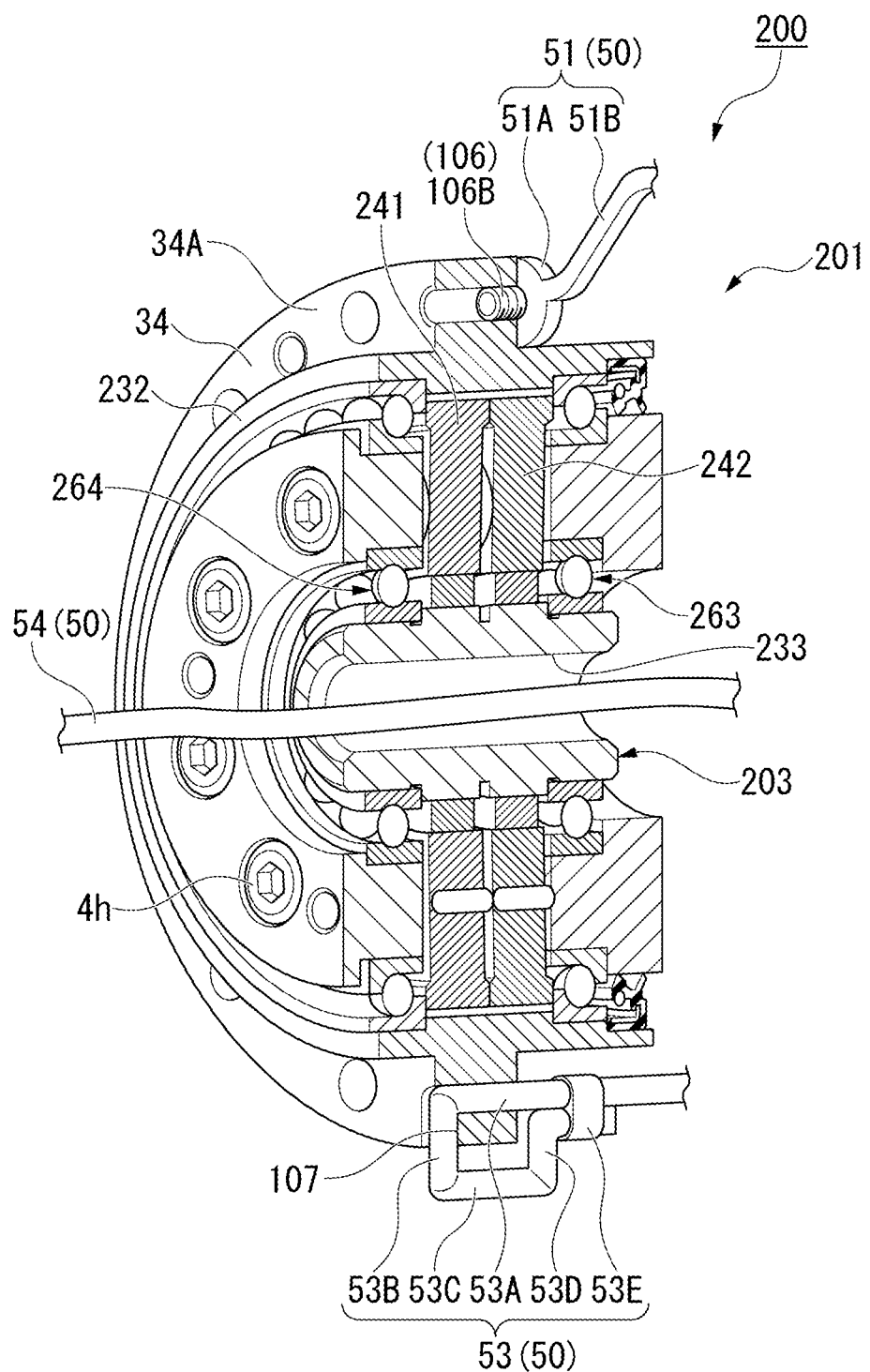
FIG. 6 is a sectional perspective view of the transmission with the falling-off prevention feature according to the second embodiment.
Figure 7:
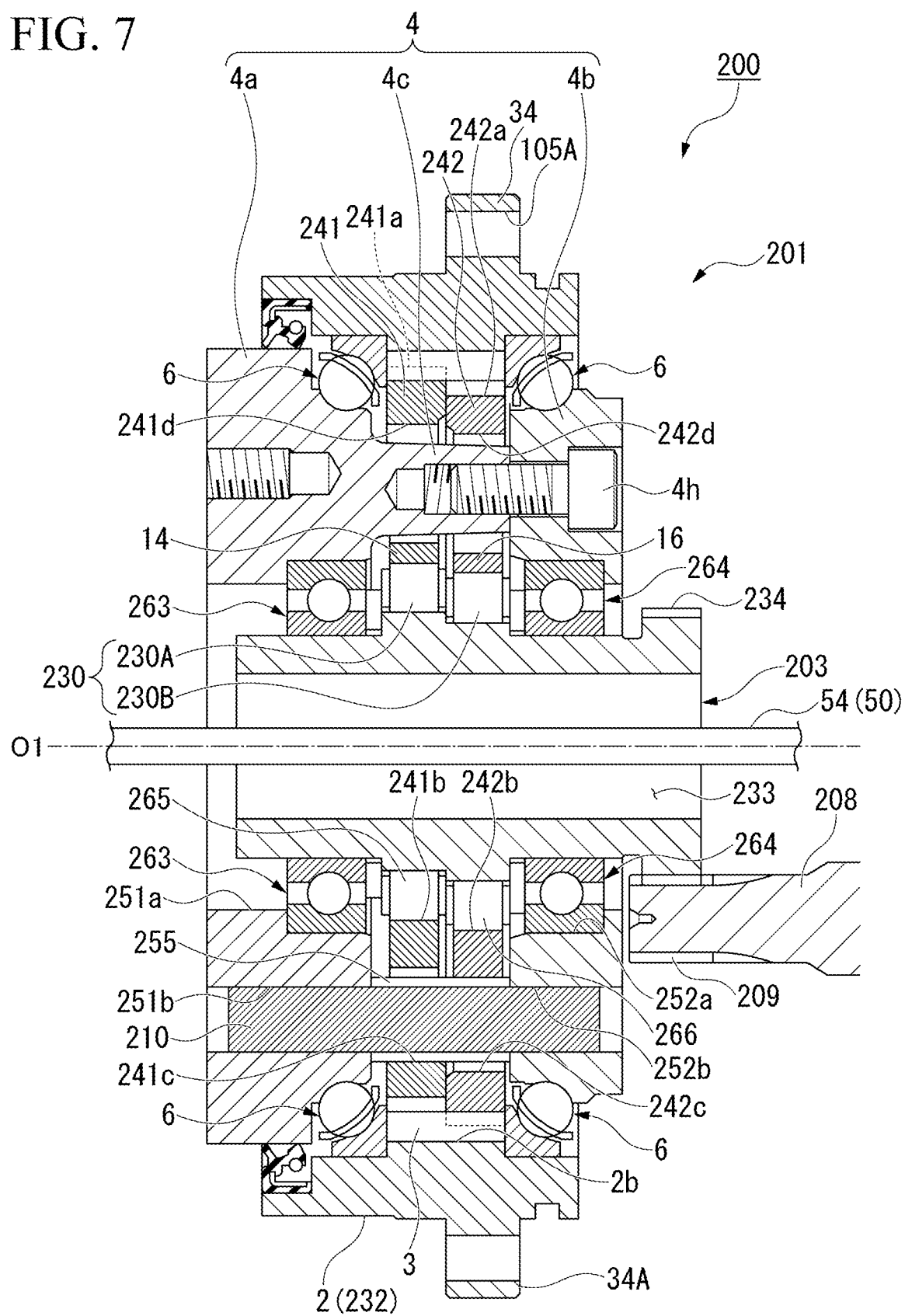
FIG. 7 is a sectional view along the line VI-VI in FIG. 5.

A speed reducer 200 with a falling-off prevention feature according to a second embodiment will be hereinafter described with reference to the accompanying drawings. FIG. 5 is a perspective view of the speed reducer 200 with the falling-off prevention feature according to the second embodiment. FIG. 6 is a sectional perspective view of the speed reducer 200 with the falling-off prevention feature according to the second embodiment. FIG. 6 shows the speed reducer 200 with the falling-off prevention feature viewed from a different direction than in FIG. 5. FIG. 7 is a sectional view along the line VI-VI in FIG. 5. FIG. 6 and FIG. 7 show different sections. For convenience of explanation, an input shaft 208 and the other end of a hollow shaft 203 (crankshaft external teeth 234) shown in FIG. 7 are omitted in FIG. 6.

The differences between the first embodiment described above and the second embodiment relate mainly to a speed reduction mechanism 240. For the second embodiment, the same constituents as in the first embodiment described above are denoted by the same reference numerals and may not be described here.

As shown in FIG. 5, the speed reducer 200 with the falling-off prevention feature according to the second embodiment includes: a speed reducer 201 for decelerating rotation from a drive source that generates a rotational force and outputting the decelerated rotation; and a coupling member 50 for coupling the speed reducer 201 to the robot R (FIG. 2) using the speed reducer 201.

In the second embodiment, the coupling member 50 includes a fourth coupling member 54 extending through a hollow portion of the speed reducer 201, in addition to the first coupling member 51, the second coupling member 52, and the third coupling member 53 described above.

Speed Reducer

The speed reducer 201 is provided, for example, at a connection portion between a pair of arms that are rotatably connected (a joint portion of the robot R). The speed reducer 201 decelerates a motor torque inputted thereto from a motor serving as a drive source (not shown) and outputs the decelerated torque. The configuration of the speed reducer 201 described below is not limitative. The speed reducer 201 may have any configuration that can change the speed of the rotation of the drive source that generates a rotational force. For example, the speed reducer 201 may be replaced with a speed-increasing gear for accelerating the rotation of the drive source that generates a rotational force and outputting the accelerated rotation.

The speed reducer 201 is what is called a hollow transmission having a hollow shaft 203 (described later). The speed reducer 201 includes a casing 30 and a speed reduction mechanism 240. The casing 30 includes a body portion 232 and a flange portion 34. In the description of the second embodiment, the term "input side" refers to the side of the speed reducer 201 connected to the drive source, and the term "output side" refers to the side of the speed reducer 201 connected to a mechanical part such as an arm receiving the output from the speed reducer 201. Specifically, the input side of the first embodiment shown in FIG. 3 is positioned in the left side of FIG. 3, and the input side of the second embodiment shown in FIG. 7 is positioned in the right side of FIG. 7.

The hollow shaft 203 is inserted into the through-hole 251a in the base plate 4a and the through-hole 252a in the end plate 4b. The hollow shaft 203 is supported by crank bearings 263, 264 as a bearing unit so as to be rotatable about the axis relative to the carrier 4. In other words, the crank bearings 263, 264 are disposed around the hollow shaft 203 and support the hollow shaft 203 so as to be rotatable relative to the carrier 4.

In the second embodiment, the portion of the hollow shaft 203 at a predetermined distance axially inward from one end of the hollow shaft 203 is supported on the base plate 4a via the crank bearing 263. The portion of the hollow shaft 203 at a predetermined distance axially inward from the other end of the hollow shaft 203 is supported on the end plate 4b via the crank bearing 264. The other end of the hollow shaft 203 projects from the casing 30 and has a larger diameter. The outer peripheral surface of the other end of the hollow shaft 203 has crankshaft external teeth 234 provided thereon.

The hollow shaft 203 may or may not have an eccentric portion 230. In the embodiment, the eccentric portion 230 includes a first eccentric portion 230A and a second eccentric portion 230B, but this is not limitative.

The hollow shaft 203 includes a hollow portion 233 that is open at at least one of the axial ends of the hollow shaft 203. In the embodiment, the hollow portion 233 extends through the entirety of the hollow shaft 203 in the axial direction, and thus the hollow portion 233 is open at both ends in the axial direction.

Fourth Coupling Member

As shown in FIGS. 5 to 7, the fourth coupling member 54 extends through the hollow portion 233 in the axial direction. The fourth coupling member 54 is configured in the same manner as the coupling member 50 described above. Both ends of the fourth coupling member 54, which are not shown, are folded to form a ring and caulked, and the ring may be hung on a hook (not shown) or the like of the robot R.

Next, an operation of the speed reducer 201 will now be described. First, an input shaft 208 rotates by driving of a motor (not shown), for example. The rotation of the input shaft 208 is transmitted to the hollow shaft 203. The number of teeth of the crankshaft external teeth 234 provided on the outer peripheral surface of the hollow shaft 203 is larger than the number of teeth of the external teeth 209 on the input shaft 208. Thus, the hollow shaft 203 rotates at a lower speed than the input shaft 208.

As the hollow shaft 203 rotates, the first eccentric portion 230A and the second eccentric portion 230B of the hollow shaft 203 rotate eccentrically. In conjunction with the eccentric rotation of the first eccentric portion 230A, a first oscillating gear member 241 rotates oscillatorily while meshing with the internal tooth pins 3, and in conjunction with the eccentric rotation of the second eccentric portion 230B, a second oscillating gear member 242 rotates oscillatorily while meshing with the internal tooth pins 3.

The oscillatory rotation of the first oscillating gear member 241 and the second oscillating gear member 242 is transmitted to the carrier 4 via a torque transmitting pin 210. The torque transmitting pin 210 is inserted into a through-hole. As the oscillating gear members rotate while meshing with the internal tooth pins 3 of the external cylinder 2 in accordance with the rotation of the hollow shaft 203, the position of the torque transmitting pin 210 also moves around the axis of the external cylinder 2. This causes the entirety of the carrier 4 to rotate relative to the external cylinder 2 at a lower speed than the input rotation. At this time, the fourth coupling member 54 is fixed to the robot R and the casing 30 without interfering with the operation of the speed reducer 201.

Since the coupling member 50 includes the first coupling member 51, the second coupling member 52, and the third coupling member 53, this embodiment produces the same advantageous effects as the first embodiment.

Advantageous Effects

In the speed reducer 200 with the falling-off prevention feature described above, the speed reducer 201 includes the hollow shaft 203 extending in the axial direction and receives rotation inputted from the drive source. The coupling member 50 includes the fourth coupling member 54 extending through the hollow shaft 203. In the above embodiment, since the coupling member 50 includes the fourth coupling member 54 extending through the hollow portion 233 of the hollow shaft 203, the speed reducer 201 can be inhibited from falling off from the robot R. In addition, since the fourth coupling member extends through the hollow portion, the speed reducer 201 can be inhibited from falling off from the robot R even when the casing of the transmission is damaged. The hollow portion 233 of the hollow shaft 203 is used to run the wire connecting to the drive source. The hollow shaft 203 can be used additionally to mount the fourth coupling member 54. Therefore, no additional processing is needed on the speed reducer 201 to mount the fourth coupling member 54.

Third Embodiment

Figure 8:
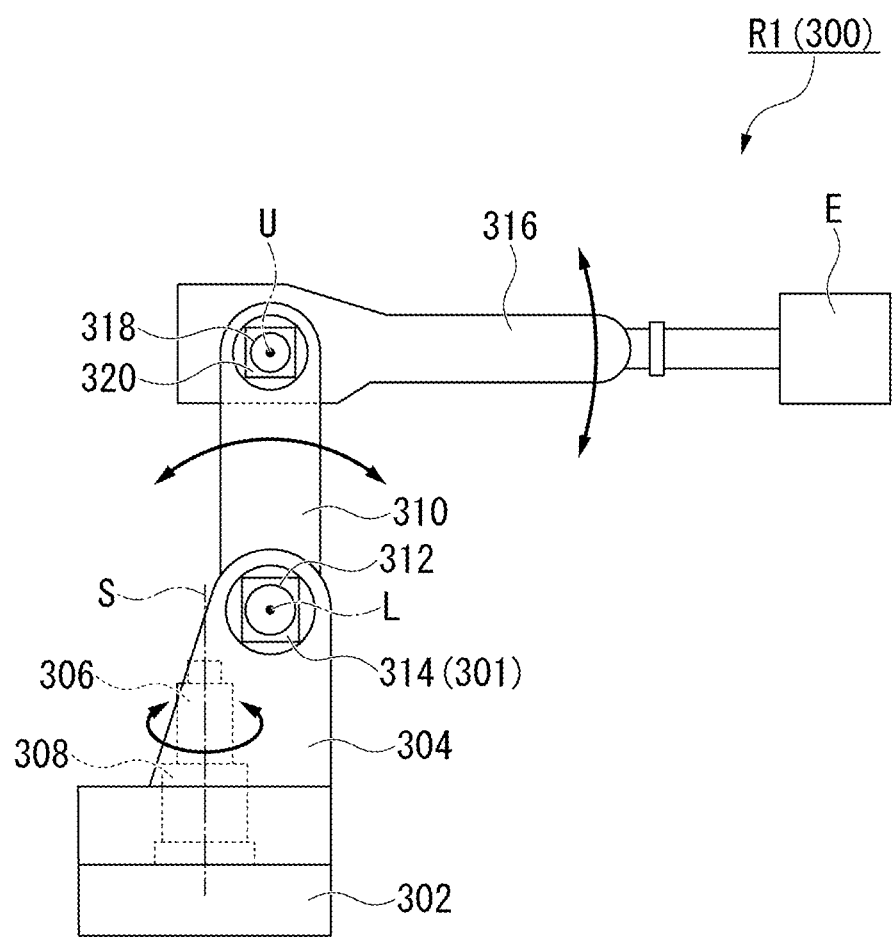
FIG. 8 is a schematic view of a robot using the transmission with the falling-off prevention feature according to a third embodiment.

A speed reducer 300 with a falling-off prevention feature according to a third embodiment will be hereinafter described with reference to the accompanying drawings. FIG. 8 is a schematic view of a robot R1 using the speed reducer 300 with the falling-off prevention feature according to the third embodiment.

The speed reducer 300 with the falling-off prevention feature includes a plurality of transmissions (a first transmission 308, a second transmission 314, and a third transmission 320) provided on the robot R1. The transmissions 308, 314, 320 have the coupling member 50 provided thereon. The speed reducer 300 with the falling-off prevention feature is a part of the robot R1. Therefore, for example, even when a plurality of transmissions are connected by the coupling member 50, the coupling member 50 is configured to couple the transmissions to the robot R1 using the transmissions.

The robot R1 includes: a fixed base 302 contacting with an installation surface; a rotating head 304 extending upward from the fixed base 302; a plurality of arms (a first arm 310 and a second arm 316) rotatably assembled to the rotating head 304, an end effector E provided on the distal end of the arms; and a plurality of transmissions (a first transmission 308, a second transmission 314, and a third transmission 320). The first arm 310 is rotatably coupled to the rotating head 304 via the plurality of transmissions 308, 314, 320. The second arm 316 is rotatably coupled to the first arm 310. Each of the transmissions 308, 314, 320 may be any one of the speed reducer 1 and the speed reducer 201 described above, or may be any combination of the speed reducer 1 and the speed reducer 201. This configuration will be hereinafter described in detail.

The rotating head 304 is assembled onto the fixed base 302 so as to be rotatable about S axis. The rotating head 304 rotates about S axis via a first servo motor 306 as a drive source and the first transmission 308. The first arm 310 is assembled to the upper portion of the rotating head 304 so as to be swingable in the front-rear direction about L axis. The first arm 310 swings in the front-rear direction about L axis via a second servo motor 312 as a drive source and the second transmission 314. The second arm 316 is assembled to the upper portion of the first arm 310 so as to be swingable in the top-bottom direction about U axis. The second arm 316 swings in the top-bottom direction about U axis via a third servo motor 318 as a drive source and the third transmission 320. With this configuration, the end effector E can be driven three-dimensionally.

In the speed reducer 300 with the falling-off prevention feature, the coupling member 50 for connecting the plurality of transmissions may be any combination of the first coupling member 51, the second coupling member 52, the third coupling member 53, and the fourth coupling member 54. For example, the first transmission 308 may be fixed with the first coupling member 51, and the second transmission 314 may be fixed with the fourth coupling member 54. The combination of the plurality of transmissions connected by the coupling member 50 can be selected as appropriate.

When the first transmission 308 provided on the fixed base 302 or the second transmission 314 provided on the rotating head 304 is coupled to the third transmission 320, the second arm 316 of the robot R1 is coupled to the base (including the fixed base 302 and the rotating head). In this manner, the second arm 316 can be prevented from falling off.

Advantageous Effects

In the speed reducer 300 with the falling-off prevention feature described above, a plurality of transmissions are provided on the robot R1. The plurality of transmissions (the first transmission 308, the second transmission 314, and the third transmission 320) are connected by the coupling member 50. Since the plurality of transmissions are connected by the coupling member 50, the first transmission 308, the second transmission 314, and the third transmission 320 can be inhibited from falling off from the robot R1, and at the same time, each transmission can inhibit falling-off of the others.

For the embodiment described above, it was described that the fixing member 106 is a screw having a head 106A and a shaft 106B with a smaller diameter than the head 106A. However, this is not limitative, and the fixing member 106 may be any member that can fix the speed reducers 100, 200, 300 with the falling-off prevention feature to the robots R, R1. For example, the fixing member 106 may be a vis or the like instead of a screw.

For the first embodiment described above, it was described that the speed reducer 1 includes the input shaft 8 corresponding to the input gear 40B, and the input shaft 8 is rotated to rotate the crankshafts 10A. It was described that, in conjunction with eccentric portions 10a and 10b of the crankshafts 10A, the oscillating gears 14 and 16 are oscillatorily rotated, resultantly the input rotation is decelerated, and the decelerated rotation is output. For the second embodiment described above, it was described that the speed reducer 201 includes: the external cylinder 2 corresponding to the body portion 232 (first cylinder); the hollow shaft 203 containing a hollow extending in the axial direction; the carrier 4; the first oscillating gear 14; the second oscillating gear 16; and the input shaft 208. However, these are not limitative, and the speed reducers 1, 201 may be any eccentrically oscillating speed reducers in which the rotation of the eccentric portions of the crankshafts 10A or the hollow shaft 203 provided in the casing 30 is decelerated and transmitted to the carrier 4, such that the carrier 4 is rotated at a lower speed relative to the rotation of the drive source.

In the embodiments described above, the mating member is a robot, but this is not limitative. The mating member may be any member from which falling-off should be prevented, for example, apparatuses such as a machine tool, unmanned carriers such as an AGV, and transportation devices.

In the embodiments disclosed herein, a member formed of multiple components may be integrated into a single component, or conversely, a member formed of a single component may be divided into multiple components. Irrespective of whether or not the constituent parts are integrated, they are acceptable as long as they are configured to solve the problems.

What is claimed is:

1. A transmission with a falling-off prevention feature, comprising:
   at least one transmission for changing a speed of rotation of a drive source, the drive source configured to generate a rotational force and output the rotation at the changed speed; and
   a coupling member configured to couple the transmission to a mating member, the transmission being configured to be mounted to the mating member in use,
   wherein the coupling member is configured to maintain coupling between the transmission and the mating member irrespective of displacement of the transmission relative to the mating member,
   wherein the transmission includes a casing, the casing being configured to be fixed to the mating member in use,
   wherein the coupling member is configured to couple the casing to the mating member,
   wherein the casing includes a flange portion having a through-hole extending through the flange portion in an axial direction of the transmission,
   wherein a fixing member is configured to be inserted or screwed into the through-hole, and
   wherein the coupling member is configured to be mounted to the fixing member.

2. The transmission with the falling-off prevention feature according to claim 1, wherein the coupling member includes a first coupling member fixed to the casing with the fixing member.

3. The transmission with the falling-off prevention feature according to claim 2, wherein the coupling member includes a second coupling member fixed to an outer peripheral surface of the casing with the fixing member.

4. The transmission with the falling-off prevention feature according to claim 1, wherein the coupling member includes a second coupling member fixed to an outer peripheral surface of the casing with the fixing member.

5. The transmission with the falling-off prevention feature according to claim 1, wherein the coupling member includes a third coupling member wound on and fixed to the through-hole.

6. The transmission with the falling-off prevention feature according to claim 5, wherein the flange portion has a groove for receiving the third coupling member embedded therein, and
   wherein the groove is continuous to the through-hole.

7. The transmission with the falling-off prevention feature according to claim 1, wherein the transmission includes a hollow shaft extending in an axial direction of the transmission and configured to receive the rotation of the drive source, and
   wherein the coupling member includes a fourth coupling member extending through the hollow shaft.

8. The transmission with the falling-off prevention feature according to claim 1,
   wherein the at least one transmission comprises a plurality of transmissions configured to be provided on the mating member, and
   wherein each of the plurality of transmissions is configured to be connected to the mating member with the coupling member.

9. The transmission with the falling-off prevention feature according to claim 1, wherein the transmission includes:
   a casing configured to be fixed to the mating member;
   at least one crankshaft provided in the casing and configured to rotate by receiving the rotation of the drive source; and
   an output shaft provided in the casing and configured to output decelerated rotation of the drive source, and
   wherein the transmission serves as an eccentric oscillating speed reducer in which rotation of the at least one crankshaft is decelerated and transmitted to the output shaft such that the output shaft rotates at a lower speed relative to the rotation of the drive source.

* * * * *